Figure 1:
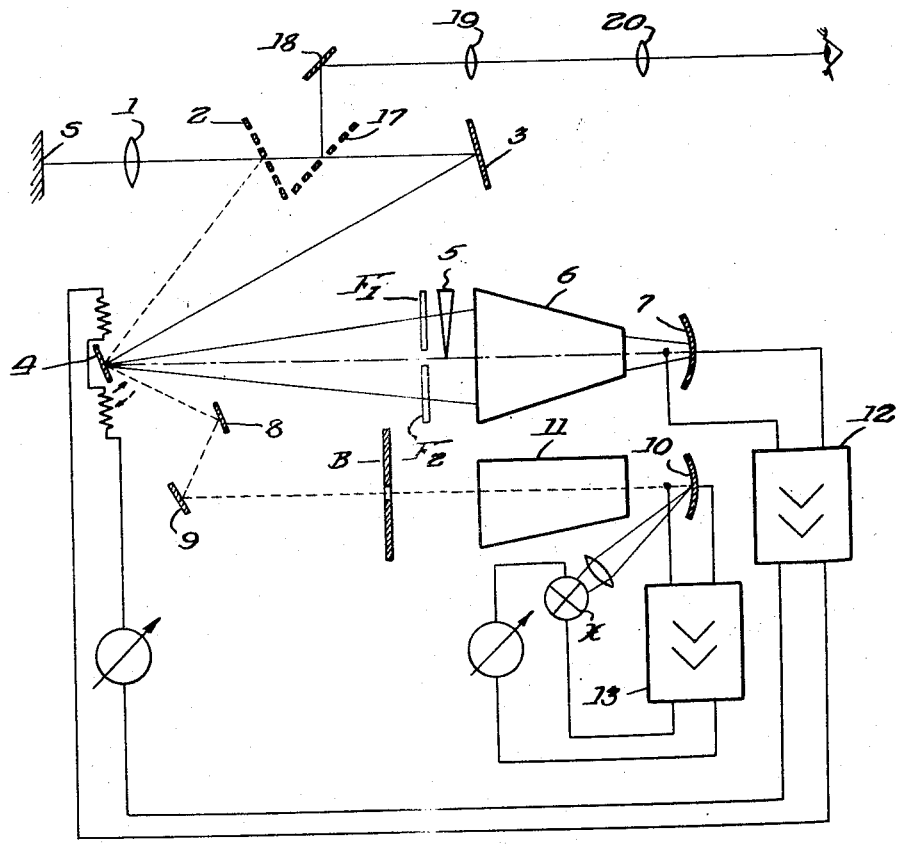

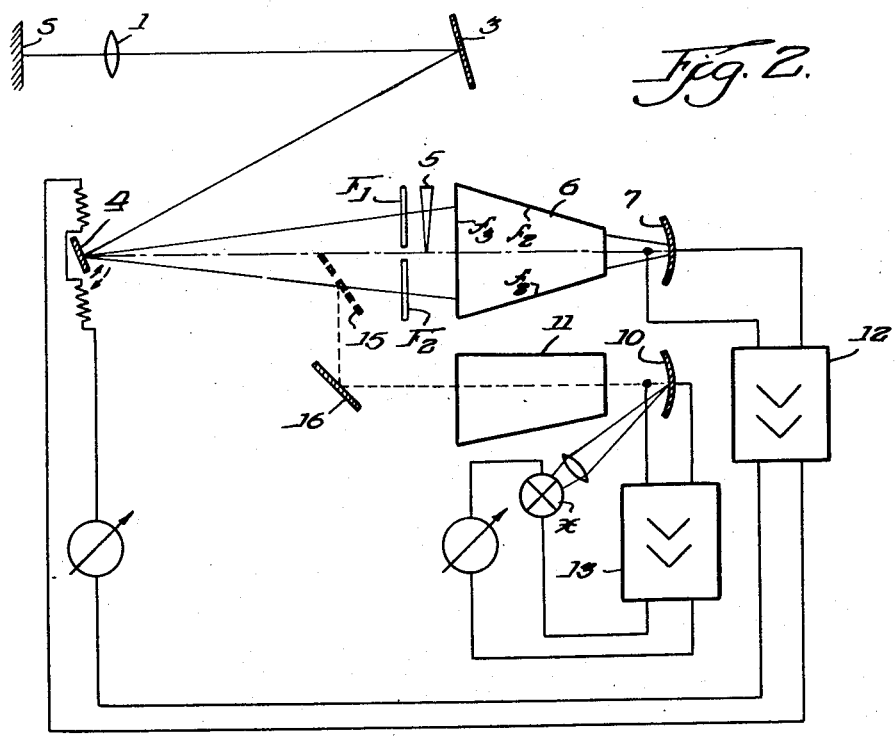
Fig. 2.
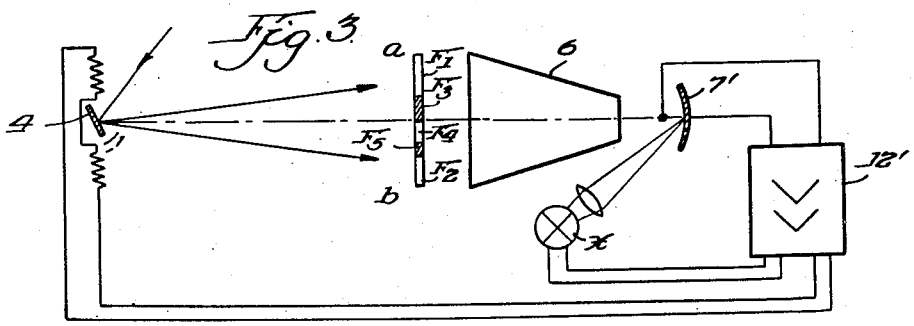
Fig. 3.
Fig. 4.
Inventors
Fritz Lieneweg,
Werner Honrath, &
Karl-Heinz Kaske.

United States Patent Office 2,702,494
Patented Feb. 22, 1955

2,702,494

APPARATUS FOR DETERMINING THE TEMPERATURES OF LIGHT-RADIATING BODIES

Fritz Lieneweg, Werner Honrath, and Karl-Heinz Kaske, Karlsruhe, Germany, assignors to Siemens & Halske Aktiengesellschaft, Munich and Berlin, Germany, a German corporation Application August 13, 1951, Serial No. 241,684

Claims priority, application Germany August 19, 1950

7 Claims. (Cl. 88—22.5)

This invention relates to temperature-measuring apparatus and is particularly concerned with the simultaneous automatically effective determination of the comparison temperature and of the color temperature of a radiating body through the medium of substantially identical measuring elements.

The color temperature of a light-radiating body is determined on the basis of the known intensity relationship between light rays of two different wave lengths. The comparison temperature is determined with a filament pyrometer by comparing the radiation of the radiating body at one wave length with the radiation emanating from a comparison body.

Compensating and controlling means are employed in carrying out both measurements. For example, in the apparatus shown in copending application Ser. No. 241,685, there is provided an oscillator which alternately throws beams of rays of two wave lengths which are to be compared, that is, the light radiation which is to be measured (black body temperature measurement), and the light radiation from a comparison source (black temperature measurement) upon a photoelectric cell. The photo-cell current is amplified to govern the oscillator which in turn controls the two light beams (one or both of which may be directed over means for attenuating the intensity thereof) in such a manner that the light impulses of identical form and/or intensity impinge upon the photoelectric cell. The electrical values resulting from the control represent criteria for the temperature values to be measured.

The invention makes it possible to measure the color and comparison temperatures of a radiating body in a simple device and over the identical objective. The light of a first wave length emanating from the radiating body is thereby compared with the light of a second wave length emanating from the body, and the rays of one of said wave lengths are at the same time compared with the light emanating from a comparison source. The comparison of the light values is effected by known and suitable amplifier devices. The measuring arrangement is made particularly simple by using for the oscillation of the light beams a single oscillating element and by effecting the equalization of the intensities of the light beams, incident to the comparison temperature measurement, by the control of the intensity of a lamp which flashes with the frequency of the oscillations of such element.

The objects outlined above and additional objects and features will appear from the description of embodiments of the invention which will presently be rendered with reference to the accompanying drawings. In these drawings, Figs. 1 and 2 illustrate in diagrammatic manner embodiments of the invention employing two separate photoelectric cells;

Fig. 3 shows in similar diagrammatic manner an embodiment using a single photoelectric cell; and Fig. 4 indicates the light impulses impinging upon the photoelectric cell in the case of the embodiment shown in Fig. 3.

The light emanating from the radiating body S in Fig. 1 produces a primary light beam passing through the objective 1 to the mirror 2, which permits passage of part of the light rays to the mirror 3. Part of the light from the mirror 3 reaches the beam oscillator comprising an oscillating mirror 4 which may be oscillated electromagnetically by suitably actuating the coils indicated in the drawing. The oscillating mirror 4 reflects and oscillates the primary light beam received from the mirror 3 alternately in one half-cycle of its oscillation through the color filter $F_1$ and in the other half-cycle through the color filter $F_2$. The oscillating beam thereupon passes through an optical condenser 6 to the photoelectric cell 7. The beam directed through the filter $F_1$ passes the member 5, which attenuates its intensity. The light permeability of the member 5 diminishes from a central median line transversely outwardly to the outer rim of the filter $F_1$.

The photoelectric cell thus receives alternating light impulses responsive to the oscillation of the mirror 4. The intensity of the impulse over the path through the color filter $F_2$ will be entirely independent of the path of the oscillating beam coming from the mirror 4, while the intensity of the beam passing through the filter $F_1$ will decrease from the center outwardly, due to the passage of the beam through the attenuating member 5. The values of two successive light impulses thus produced by the oscillating beam are compared in the phase-sensitive amplifier 12, of known and suitable construction and the amplitude of oscillation of the mirror is so adjusted that the mean values of the light impulses become identical. The operation of the oscillating mirror is governed by the current from the amplifier. The output current of the amplifier is a criterion for the desired measuring value, that is, for the color temperature of the radiating body S.

Another part of the primary light beam from the radiating body S is thrown through the mirror 2 upon the oscillating mirror 4 at a different angle, over the path indicated by the dotted line extending from the mirror 2 to the mirror 4. The resulting beam is, during the first half-cycle of the mirror 4 in which the beam passes through the filter $F_1$, directed by way of the optical members 8 and 9 upon the upper portion of the shutter or shield B. During the other half-cycle, the oscillating beam will pass through the gap in the shield or shutter B, and after passing the optical condenser 11 it will impinge on the photoelectric cell 10.

A comparison light source, for example, a lamp X, is synchronized for flashing with the frequency of the oscillating mirror 4 and is thus switched on during the first half-cycle thereof, when the light beam strikes the shutter B.

The photoelectric cell 10 therefore receives alternating light impulses from the radiating body S and from the comparison lamp X. The intensity of the light impulses from the lamp X is now by the amplified photoelectric cell current (amplifier 13) so regulated that it has the same intensity as the light impulses from the radiating source S, which are received through the gap of the shield or shutter B. The lamp current is a criterion for the comparison temperature of the radiating body S.

It will be seen from the foregoing explanations that a simultaneous objective measurement of the color temperature and of the comparison temperature can be carried out in one and the same apparatus, by simple means and substantially over the identical objective, by oscillating the primary light beam coming from the radiant body S, relative to two color filters $F_1$ and $F_2$, by means of a single element, for example, the electromagnetically operated oscillating mirror 4 and by deriving a secondary light beam from the primary light beam for coaction with a comparison light source. The color filters transmit in different and spaced spectral bands. The color temperature is then determined in generally known manner over the photoelectric cell 7 and associated amplifier 12. The black body temperature or comparison temperature is determined by using the secondary light beam which is directed together with the beam from a comparison light source X upon a further photoelectric cell 10. The light intensity of the secondary light beam and that of the comparison light source are compared by the use of known photoelectric cell means 10 and amplifier means 13 and the intensity difference is used for adjusting the current feed to the comparison light source correspondingly so that the electrical impulses supplied by the photoelectric cell become substantially equal to the light impulses of the secondary light beam and the light from the comparison source X. The flashing of the comparison light source X is obtained electrically by periodic actuation thereof in step with the actuation of the oscillating mirror 4.

In the upper part of Fig. 1 is indicated a device for determining and sighting the point of the radiating body S at which the temperature is to be measured. The radiating body S may be sighted, for example, over suitable optical means 19, 20, mirror 18 and mirror 17. Suitable mounting and adjusting means (not shown) may be provided for securing and for adjusting the various elements of the arrangement in desired position determined by the sighting device. A separate ordinary mirror may be used in place of the mirror 17. The separate mirror is in such a case suitably adjustably mounted so as to dispose it in position for the sighting of the apparatus to a desired point of the radiating body S. After the sighting is completed the mirror is angularly tilted out of the beam path, and the measuring can then proceed as described.

In the embodiment shown in Fig. 2, the color temperature of the radiating body S is measured in the manner described in connection with Fig. 1. The primary light coming from the radiant source S over the objective 1 and the mirror 3 is thrown upon the oscillating mirror 4 and oscillated thereby relative to the color filter means $F_1$ and $F_2$. An attenuating body 5 is provided in series with the filter $F_1$ as before. The light impulses thereupon pass through the condenser 6 to the photoelectric cell 7. The currents produced by the photoelectric cell 7 are as before fed to the amplifier 12 for the purpose described in connection with Fig. 1. In the path of the oscillating beam which passes through the color filter $F_2$ is disposed the mirror 15 which is adapted to pass part of the light rays of the beam thereby producing the secondary beam which is thrown upon the mirror 16, during the second half-cycle of the oscillating mirror 4, and the corresponding secondary beam is directed through the optical condenser 11 to the photoelectric cell 10. The comparison light source or lamp X flashes again during the first half-cycle of the mirror 4 when the primary light beam passes the filter $F_1$, and the intensity of the lamp is again controlled by the amplifier 13, as described in connection with Fig. 1.

It is possible, in accordance with the invention, as shown in Fig. 3, to operate with a single photoelectric cell. The elements serving for the measuring of the color temperature operate in this case as previously described. The surfaces $F_3$ and $F_5$ of the color filters are blanked out by suitable shutters or by opaque paint placed on the corresponding areas. The lamp X flashes momentarily at the instant when the light beam oscillating over the area extending between $a$—$b$ is blanked out at $F_3$.

The photoelectric cell 7' in Fig. 3 receives the light impulses illustrated in Fig. 4. During one oscillation cycle of the mirror 4 (Fig. 3) there are produced the light impulses of different wave length for the color temperature measurement, which pass to the photoelectric cell 7' through the color filters $F_1$ and $F_2$ and condenser 6 as previously described. Light impulses are also produced for the measuring of the comparison temperature which originate at the comparison source or lamp X and at the radiation source, respectively, the impulses from the source X passing directly to the photoelectric cell 7' and the impulses from the radiation source passing through the area $F_4$ and condenser 6 to the photoelectric cell 7'. These impulses impinge on the photoelectric cell 7' shown in Fig. 3. The currents of the photoelectric cell, which are produced responsive to these impulses, are received by the amplifier shown. This amplifier is a selective impulse amplifier which compares the impulses produced by the oscillating beam that pass through the filters $F_1$ and $F_2$, and regulates (equalizes) these impulses to the identical value as before, by regulation of the amplitude of the oscillation of the mirror 4. The amplifier 12' also compares the impulses from the comparison source X with those that pass through the area $F_4$ and effects regulation of the intensity of the comparison impulses so as to effect equalization of the intensity thereof with the intensity of the impulse through the area $F_4$.

The amplifier means employed in the embodiments of Figs. 1 and 2, using two photoelectric cells, may be greatly simplified by utilizing for the application of both impulse series (for the comparison and color temperature) devices having a common current supply.

A particularly simple optical means for training upon the photoelectric cell the two light beams which are to be compared is a glass block, as shown in Fig. 2 at 6, which is formed for total reflection perpendicular to the beam path. The light rays are, by the inclined reflecting surfaces $f_1$ and $f_2$, condensed for impinging upon the photoelectric cell largely independent of the particular points at which the beam may enter the transverse wall $f_3$.

Changes may be made within the scope and spirit of the accompanying claims.

We claim:

1. Apparatus for objectively automatically measuring the color temperature and the comparison temperature of a radiant body comprising a single objective for receiving light rays from said radiant body to form a primary light beam, a single oscillable mirror for receiving and for reflecting said primary light beam, electromagnetic means for oscillating said oscillable mirror to either side of a median line so as to oscillate said reflecting primary light beam, two color filter means which respectively transmit in different and spaced spectral bands, said color filter means being disposed in the path of said reflected oscillating primary light beam in two distinct regions spaced from said median line to cause such beam to pass alternately through said color filter means during corresponding oscillation thereof to the sides of said median line, attenuating means disposed in series with one of said color filter means for modifying the light intensity of the oscillating primary light beam passing therethrough, a first photoelectric cell for receiving the light impulses produced by said reflected oscillating primary light beam incident to the passage thereof through said color filter means, means including an amplifier for receiving the consequent electrical impulses from said photoelectric cell for evaluating such impulses to measure said color temperature, a comparison light source, means for deriving from said primary light beam a secondary beam, a second photoelectric cell for receiving light from said comparison light source and from said secondary beam, and a device including an amplifier for receiving consequent electrical impulses from said second photoelectric cell to evaluate such impulses in accordance with the relative intensity of said comparison source and said secondary beam to measure said comparison temperature.

2. The apparatus as set forth in claim 1, comprising optical means for subdividing said primary light beam to form two separate primary beams and for training such separate primary beams upon said oscillable mirror from different angles, one of said separate primary beams being oscillated by said mirror relative to said color filter means and the other separate primary beam being oscillated by said mirror for optical co-operation with said second photoelectric cell and said comparison light source.

3. The apparatus as set forth in claim 1, comprising shutter means in the path of said secondary beam for training such secondary beam upon said second photoelectric cell.

4. The apparatus as set forth in claim 1, comprising means for flashing said comparison light source with the frequency of oscillation of said mirror, and means for modifying the intensity of said comparison light source in accordance with the intensity of said secondary beam.

5. The apparatus as set forth in claim 1, comprising a mirror forming the means for deriving from said primary light beam said secondary beam, said mirror being positioned in the path of said oscillating primary light beam when such beam passes through one of said color filters.

6. Apparatus for objectively automatically measuring the color temperature and the comparison temperature of a radiant body comprising a single objective for receiving light rays from said radiant body to form a primary light beam, a single oscillable mirror for receiving and for reflecting said primary light beam, electromagnetic means for oscillating said oscillable mirror to either side of a median line so as to oscillate said reflected primary light beam, two color filter means which respectively transmit in different and spaced spectral bands, said color filter means being disposed in the path of said reflected oscillating light beam in two distinct regions spaced from said median line to cause such beam to pass alternately through said color filter means during corresponding oscillation thereof to the sides of said median line, a comparison light source, photoelectric cell means for receiving light impulses produced by said reflected oscillating beam upon passage thereof through said color filter means and for receiving light impulses produced by said reflected oscillating beam and by said comparison light source, respectively, and a device including amplifier means for receiving the consequent electrical impulses from said photoelectric cell means and for evaluating such impulses to measure said color temperature and said comparison temperature, respectively.

7. The structure defined in claim 6, comprising a single photoelectric cell for receiving light impulses from all of said light beams and from said comparison light source, and means controlled by said amplifier means for governing the amplitude of oscillation of said oscillating mirror and the intensity of said comparison light beam, respectively.

References Cited in the file of this patent

UNITED STATES PATENTS

| | | |
|---|---|---|
| 2,096,323 | Gille | Oct. 19, 1937 |
| 2,113,450 | Lasky et al. | Apr. 5, 1938 |
| 2,166,824 | Runaldue | July 18, 1939 |
| 2,222,429 | Brierbrecher | Nov. 19, 1940 |
| 2,406,318 | Brace | Aug. 27, 1946 |
| 2,408,023 | Kruper | Sept. 24, 1946 |